United States Patent
Wang

(10) Patent No.: US 7,349,045 B2
(45) Date of Patent: Mar. 25, 2008

(54) DISPLACEMENT-DESIGNED COLOR FILTER STRUCTURE AND METHOD OF FORMING THE SAME

(75) Inventor: Ying-Jie Wang, Taipei Hsien (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 359 days.

(21) Appl. No.: 10/996,091

(22) Filed: Nov. 24, 2004

(65) Prior Publication Data

US 2006/0109400 A1    May 25, 2006

(51) Int. Cl.
*G02F 1/1335* (2006.01)

(52) U.S. Cl. ........................ 349/106; 349/110

(58) Field of Classification Search ............... 349/110, 349/106, 123, 187, 158, 138, 109
See application file for complete search history.

(56) References Cited

U.S. PATENT DOCUMENTS 7,136,121 B2* 11/2006 Yeh et al. .................. 349/106

2002/0008813 A1* 1/2002 Miyakawa et al. ......... 349/106

FOREIGN PATENT DOCUMENTS

| JP | 02311802 | 12/1990 |
|---|---|---|
| JP | 07113908 | 5/1995 |
| JP | 07191212 | 7/1995 |

* cited by examiner

*Primary Examiner*—Thoi V. Duong

(57) ABSTRACT

The present invention provides a color filter structure and a forming the same method. The structure comprises a transparent substrate, a black matrix and a plurality of color regions separated by the black matrix. The black matrix grid is formed by a plurality of horizontal black matrix strips crossing a plurality of vertical black matrix strips. These color regions are formed by red, green or blue color resin forming in corresponding matrix grids. In each matrix grid, the resin is positioned to cover a larger area on an adjacent vertical black matrix strip than to cover an area of the other adjacent vertical black matrix strip. The structure can prevent the problem of corner image sticking in a frame of the liquid crystal display device.

21 Claims, 3 Drawing Sheets

DISPLACEMENT-DESIGNED COLOR FILTER STRUCTURE AND METHOD OF FORMING THE SAME

FIELD OF INVENTION

The present invention relates to a liquid crystal display (LCD) device. More particularly, the present invention relates to a displacement-designed color filter structure of an LCD device.

DESCRIPTION OF RELATED ART

A color filter substrate is a key component for the realization of a color LCD device. Since nowadays the thin film transistor LCD (TFT LCD) device is the most important type of LCD devices, color filter substrates for a TFT LCD have potential demand and good prospects in the market.

A conventional LCD includes two substrates, a color filter substrate and a TFT array substrate, and a liquid crystal layer therebetween. FIG. 1A illustrates the structure of a conventional color filter substrate. As shown in FIG. 1A, the color filter substrate includes a transparent substrate 100, a black matrix 104 and a plurality of color regions separated by the black matrix. The black matrix 104 is composed of a plurality of horizontal black matrix strips 104b and a plurality of vertical black matrix strips 104a. The horizontal black matrix strips 104b cross the vertical black matrix strips 104a to form a grid structure so as to create a plurality of color regions 102. Red (R) color layer 102R, green (G) color layer 102G or blue (B) color layer 102B is formed on a corresponding color region 102. On the color layers 102R, 102G and 102B, a common electrode 106 is formed. The common electrode 106 is one of two electrodes used to generate an electric field across the liquid crystal layer when operating the LCD device.

FIG. 1B shows a plan view of a conventional color filter substrate, and FIG. 2A shows a cross-sectional view, taken along the cut line V-V', of the panel of FIG. 1B for illustrating a probable problem of a conventional color filter substrate. In FIG. 1B, the black matrix 104 is formed between the color filters in a grid pattern. The black matrix 104 is composed of a plurality of horizontal black matrix strips 104b and a plurality of vertical black matrix strips 104a. The horizontal and vertical black matrix strips 104b and 104a are disposed at positions corresponding to the gate and source lines of the TFT panel, respectively.

With reference to FIG. 2A, in a conventional color filter structure, color layers 102R, 102G and 102B must partially overlap and cover the adjacent vertical black matrix strips 104a in order to avoid light leakage. After an electrically conductive layer (not shown in FIG. 2A) acting as an electrode is then formed on the substrate 100 and color layers 102R, 102G and 102B, a rubbing process is performed. Prior to the rubbing process, an alignment film, e.g. a resin coating, is formed on the conductive layer. The resin coating usually comprises polyimide, which is abbreviated as PI in the LCD industry. The rubbing process is performed by using a metal roller, covered with a nap cloth, to rub the resin coating, or rotating the roller to and fro along the surface of the resin coating, with the purpose of making subsequently placed liquid crystal molecules face in a specified direction in advance. As shown in FIG. 2A, the two portions of the color layer 102B overlying the two adjacent vertical black matrix strips 104a have a bulging shape, so when the rubbing direction is from left to right, the height differences x and y associated with the two portions result in regions, the abnormal rubbing areas 108 and 110, where the resin coating there cannot be rubbed well. When the rubbing direction is from right to left, the abnormal rubbing areas are on sides opposite the abnormal rubbing areas 108 and 110, respectively. Similarly, the color layers 102R and 102G also cause abnormal rubbing areas in the same way.

The above-mentioned abnormal rubbing areas can cause the problem of corner image sticking in a frame displayed on the liquid crystal display device. Since the vertical black matrix strips 104a blocks the abnormal rubbing area 110, light leakage doesn't occur; on the other hand, since the abnormal rubbing area 108 is within the display area, light leakage occurs and results in corner image sticking. The phenomenon of corner image sticking is illustrated in FIG. 2B. When the lamps of the LCD panel are lighted, there are white strip areas 202 and 204 on the four side edges of the corner image sticking examination frame 200. After the corner image sticking examination frame 200 switches to the fully dark frame 206, some spots in the white strip areas 202 and 204 cannot turn dark, resulting in the phenomenon of corner image sticking 208. This is due to the larger thickness of the PI resin coating at the four side edges of the panel, and therefore the degree to which the resin coating on the abnormal rubbing areas cannot be rubbed is more serious, more easily causing the corner image sticking.

SUMMARY OF THE INVENTION

An objective of the present invention is to provide a color filter structure for an LCD device to solve the problem of corner image sticking.

Another objective of the present invention is to provide a method for forming a color filter structure of a liquid crystal display device, in order to solve the problem of corner image sticking.

In accordance with the foregoing and other objectives of the present invention, a color filter structure of a liquid crystal display is provided. The structure comprises a transparent substrate, a black matrix and a plurality of color regions separated by the black matrix. The black matrix is formed on the transparent substrate, and includes a plurality of horizontal black matrix strips and a plurality of vertical black matrix strips. The horizontal black matrix strips crossing the vertical black matrix strips forms a grid structure so as to create a plurality of color regions. Than, red (R) color layer, green (G) color layer or blue (B) color layer is formed in a corresponding color region. These color layers are formed by resin material. In each color region, the resin is positioned to cover a larger area on an adjacent vertical black matrix strip than to cover an area of the other adjacent vertical black matrix strip.

Furthermore, the present invention is directed to a method for forming a color filter structure of a liquid crystal display device. First, a plurality of horizontal black matrix strips and a plurality of vertical black matrix strips are formed in a transparent substrate. The horizontal black matrix strips cross the vertical black matrix strips to form a grid structure to create a plurality of color regions. Than, corresponding color layers are formed in color regions. Each of the color layers in a color region is positioned to cover a larger area of an adjacent vertical black matrix strip than to cover an area of the other adjacent vertical black matrix strip among the vertical black matrix strips.

Advantages of the invention include the following. The color filter structure can prevent the problem of corner image sticking in a frame of a liquid crystal display device. The color filter structure of the invention can reduce the height difference between different portions of a color filter, which solves the problem of poor rubbing quality. The corner image sticking is thus avoided.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1A:
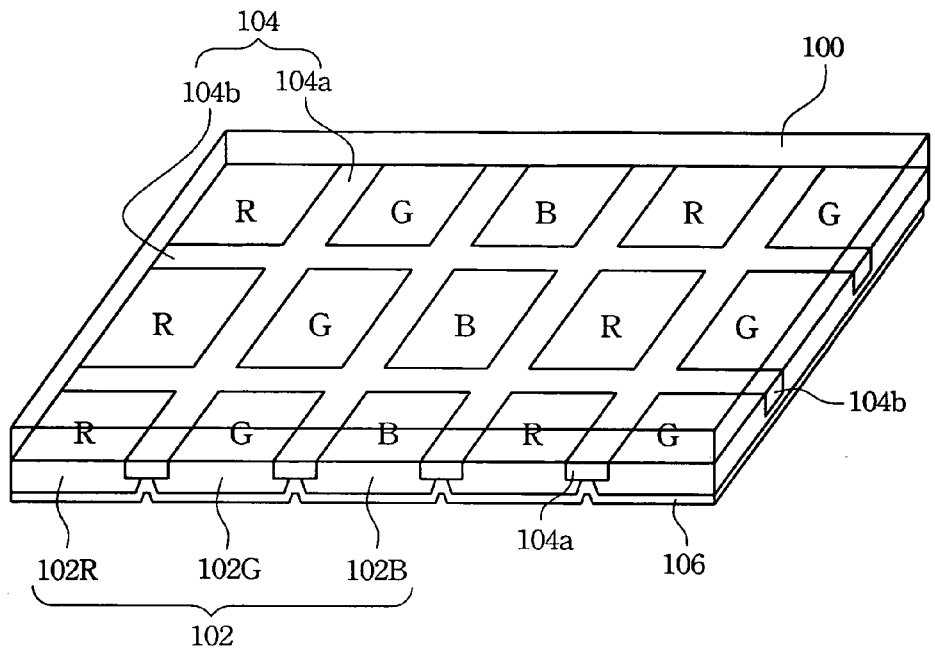
FIG. 1A shows the structure of a conventional color filter substrate.
Figure 1B:
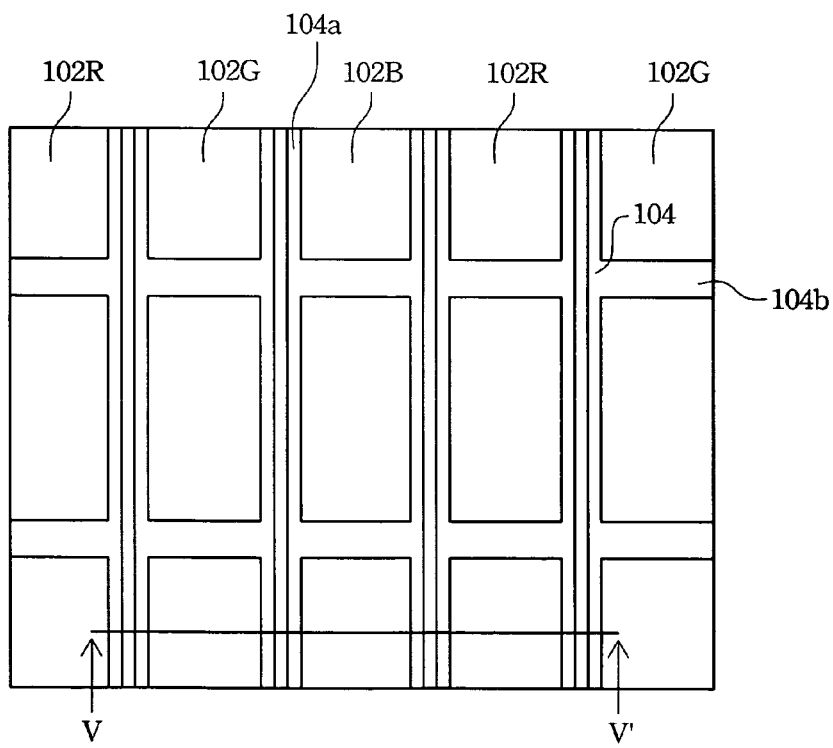
FIG. 1B shows a plan view of the structure of FIG. 1A.
Figure 2A:
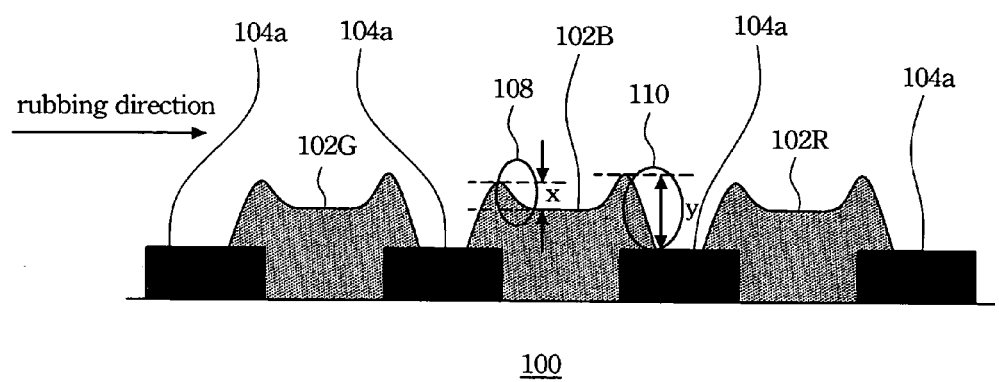
FIG. 2A shows a cross-sectional view, taken along the cut line V-V, of the structure of FIG. 1B.
Figure 2B:
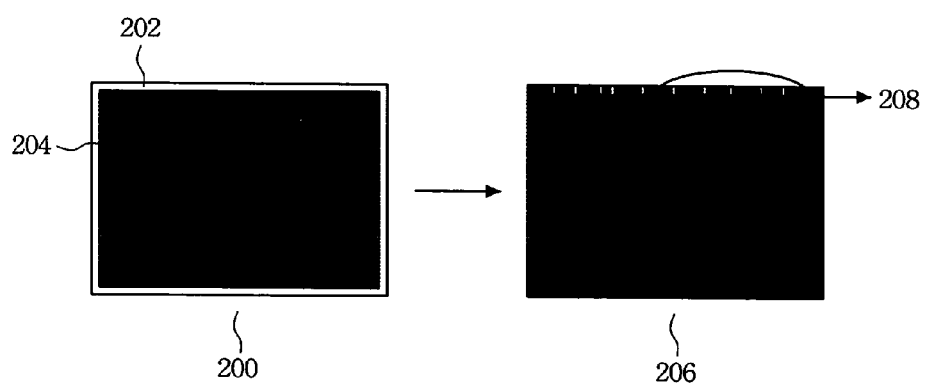
FIG. 2B illustrates the phenomenon of corner image sticking.
Figure 3A:
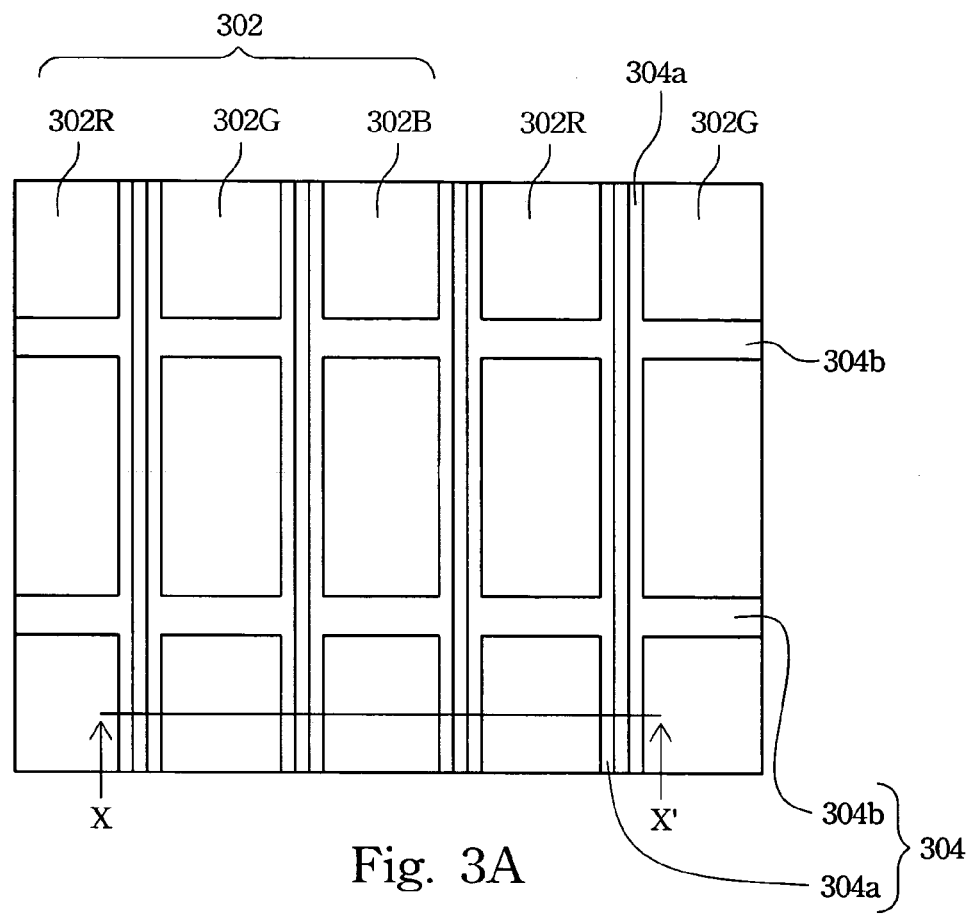
FIG. 3A shows a plan view of a color filter structure according to an embodiment of the present invention.
Figure 3B:
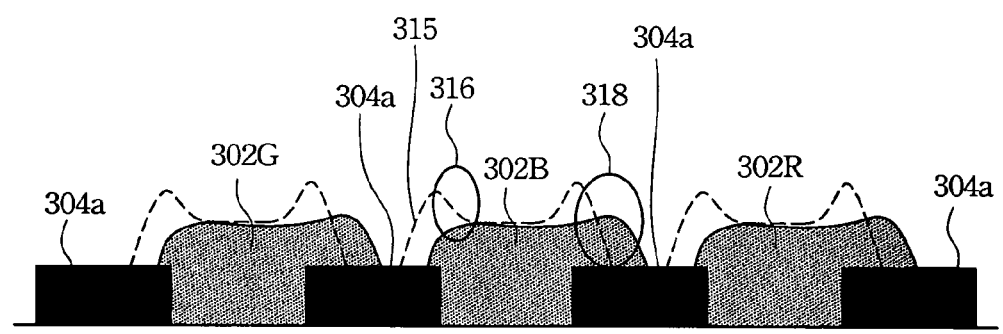
FIG. 3B shows a cross-sectional view, taken along the cut line X-X, of the structure of FIG. 3A.

The invention provides a color filter structure for a liquid crystal display device. FIG. 3A shows a plan view of a color filter structure according to an embodiment of the present invention, and FIG. 3B shows a cross-sectional view, taken along the cut line X-X, of the structure of FIG. 3A. With reference to FIG. 3A and 3B, the color filter structure comprises a transparent substrate 300, a black matrix 304 and a plurality of color regions 302 separated by the black matrix 304. The black matrix 304 is formed on the transparent substrate 300, and includes a plurality of horizontal black matrix strips 304b and a plurality of vertical black matrix strips 304a. The horizontal black matrix strips 304b crossing the vertical black matrix strips 304a forms a grid structure so as to create a plurality of color regions 302. Color layers, a red (R) color layer 302R, a green (G) color layer 302G or a blue (B) color layer 302B, are formed in corresponding color regions. These color layers are formed by resin material. The substrate 300 may be a glass substrate or a quartz substrate. The black matrix grid 304 is formed of an opaque metal such as chromium, and is deposited on the substrate 300.

The color layers are formed on the substrate 300 are described in the following and on portions of the vertical black matrix strips 304a. In this embodiment, first, a red resin is coated on the substrate 300 having black matrix strips 304b and 304a, and patterned to form red color layers 302R. A green resin is coated on the substrate 300, and patterned to form green color layers 302G adjacent the red color layers 302R. A blue resin is coated on the substrate 300, and patterned to form blue color layers 302B between the red color layers 302R and the green color layers 302G it is noticed that other color layer forming method also cane be used in the present invention.

As shown in FIG. 3B, the color layerslayers 302B, 302R and 302G must partially overlap and cover the adjacent vertical black matrix strips 304a in order to avoid the leakage of light. In FIG. 3B, the dotted line 315 represents the profile of the color layers in the prior art. An important feature of the present invention is that each of the color layers is positioned to cover a larger area of an adjacent vertical black matrix strip 304a than to cover an area of the other adjacent vertical black matrix strip 304a. Such color layers may be called displacement-designed (designed to be displaced or offset), which means the two portions of each color filter overlying the two adjacent vertical black matrix strips respectively are not symmetrical. For example, the portion of the blue color filter 302B overlying the left-hand adjacent vertical black matrix strip 304a is smaller than the portion overlying the right-hand adjacent vertical black matrix strip 304a, as shown in FIG. 3B. Compared to the profile of the color layers in the prior art, the color layers of the embodiment therefore looks as if they are displaced to the right, thus the term "displacement-designed".

An electrically conductive layer (not shown in FIG. 3B), which acts as an electrode, must then be formed on the substrate 300 and the colorlayers 302. The electrically conductive layer is usually an indium tin oxide (ITO) layer. A rubbing process is performed afterwards. Prior to the rubbing process, an alignment film, e.g. a resin coating, is formed on the conductive layer.

Furthermore, the displacement-designed color layers in FIG. 3B have the effect of reducing the height difference between the portion of a color layer covering the black matrix strip 304a and the remaining adjacent part thereof.

Taking the blue color layer 302B as an example, both portions overlying the two adjacent black matrix strips 304a respectively don't have an apparent bulging shape, as shown in FIG. 3B, so each of the areas 316 and 318 of the blue color layer 302B corresponding to the abnormal rubbing areas in the prior art has a significantly reduced height difference. When the rubbing direction is from left to right, since the area 316 within the display area has a significantly reduced height difference, the alignment film can still be rubbed, preventing the area 316 from becoming an abnormal rubbing area. The area 318 also has a significantly reduced height difference. Since the area 318 is blocked by the black matrix strip 304a, light leakage won't occur even if the area 318 is an abnormal rubbing area. Therefore the display quality is not degraded. Similarly, when the rubbing direction is from left to right, the red color layer 302R and the blue color layer 302B can also avoid the corner image sticking.

Accordingly, the present invention is directed to a method for forming a color filter structure of a liquid crystal display device. As shown in the FIG. 3A and FIG. 3B, a black matrix is formed on a substrate first. The black matrix with a grid structure is formed by a plurality of horizontal black matrix strips crossing a plurality of vertical black matrix strips. The black matrix create a plurality of color regions. Then, a plurality of color layers are formed in corresponding color regions. Each of the color layers is positioned to cover a larger area of an adjacent vertical black matrix strip than to cover an area of the other adjacent vertical black matrix strip among the vertical black matrix strips.

According to the preferred embodiment of the invention described above, advantages of the invention include the following. The color filter structure of the invention can reduce the height difference between different portions of a color filter, which solves the problem of poor rubbing quality. The corner image sticking is thus avoided.

Although the present invention has been described in considerable detail with reference to certain preferred embodiments thereof, other embodiments are possible. Therefore, their spirit and scope of the appended claims should not be limited to the description of the preferred embodiments contained herein.

What is claimed is:

1. A color filter structure of a liquid crystal display, comprising:
   a transparent substrate;
   a black matrix with a plurality of grids formed by a plurality of horizontal black matrix strips crossing a plurality of vertical black matrix strips; and
   a plurality of color regions are arranged in said grids sequentially followed by red color, green color and blue color,
   wherein
   a plurality of resins are arranged in the color regions for defining the colors of the color regions, respectively, wherein the resins are separated from each other, and
   in each grid, the resin for defining the color of each color region is positioned to cover a larger area of an adjacent vertical black matrix strip than an area of the other adjacent vertical black matrix strip among the vertical black matrix strips, and a height difference exists between the portion of the resin covering the vertical black matrix strip and the remaining adjacent part thereof.

2. The color filter structure of claim 1, further comprising an electrically conductive layer formed on said transparent substrate and the color regions.

3. The color filter structure of claim 2, wherein the electrically conductive layer comprises an indium tin oxide layer.

4. The color filter structure of claim 1, wherein said transparent substrate is a glass substrate.

5. The color filter structure of claim 1, wherein said transparent substrate is a quartz substrate.

6. The color filter structure of claim 1, wherein the black matrix is formed by an opaque metal.

7. The color filter structure of claim 1, wherein the black matrix is formed by resin.

8. The color filter structure of claim 1, wherein the black matrix is formed by chromium.

9. A method for forming a color filter of a liquid crystal display, comprising the steps of:
   forming a black matrix with a plurality of grids on a transparent substrate, wherein the black matrix is formed by a plurality of horizontal black matrix strips crossing a plurality of vertical black matrix strips; and
   forming a plurality of color layers on the corresponding grids, respectively, wherein the color layers are separated from each other;
   wherein in each grid, a resin for forming each color layer is positioned to cover a larger area of an adjacent vertical black matrix strip than an area of the other adjacent vertical black matrix strip among the vertical black matrix strips, and a height difference exists between the portion of the color layer covering the vertical black matrix strip and the remaining adjacent part thereof.

10. The method of claim 9, further comprising an electrically conductive layer formed on said transparent substrate and the color regions.

11. The method of claim 10, wherein the electrically conductive layer comprises an indium tin oxide layer.

12. The method of claim 9, wherein said transparent substrate is a glass substrate.

13. The method of claim 9, wherein said transparent substrate is a quartz substrate.

14. The method of claim 9, wherein the black matrix is formed by an opaque metal.

15. The method of claim 9, wherein the black matrix is formed by resin.

16. The method of claim 9, wherein the black matrix is formed by chromium.

17. A liquid crystal display structure, comprising:
    a TFT array substrate;
    a color filter substrate, wherein said color filter substrate comprises:
        a transparent substrate;
        a black matrix with a plurality grids formed by a plurality of horizontal black matrix strips crossing a plurality of vertical black matrix strips; and
        a plurality of color regions are arranged in said grids sequentially followed by red color, green color and blue color,
        wherein
        a plurality of resins are arranged in the color regions for defining the colors of the color regions, respectively, wherein the resins are separated from each other, and
        in each grid, the resin for defining the color of each color region is positioned to cover a larger area of an adjacent vertical black matrix strip than an area of the other adjacent vertical black matrix strip among the vertical black matrix strips, and a height difference exists between the portion of the resin covering the vertical black matrix strip and the remaining adjacent part thereof; and
    a liquid crystal molecule layer located between said TFT array substrate and said color filter substrate.

18. The structure of claim 17, wherein said transparent substrate is a glass substrate.

19. The structure of claim 17, wherein said transparent substrate is a quartz substrate.

20. The structure of claim 17, wherein the black matrix is formed by an opaque metal.

21. The structure of claim 17, wherein the black matrix is formed by chromium.

* * * * *